Nov. 27, 1923.
C. C. SHAFER
1,475,248
EGG TREATING MACHINE
Filed Feb. 23, 1922
2 Sheets-Sheet 1
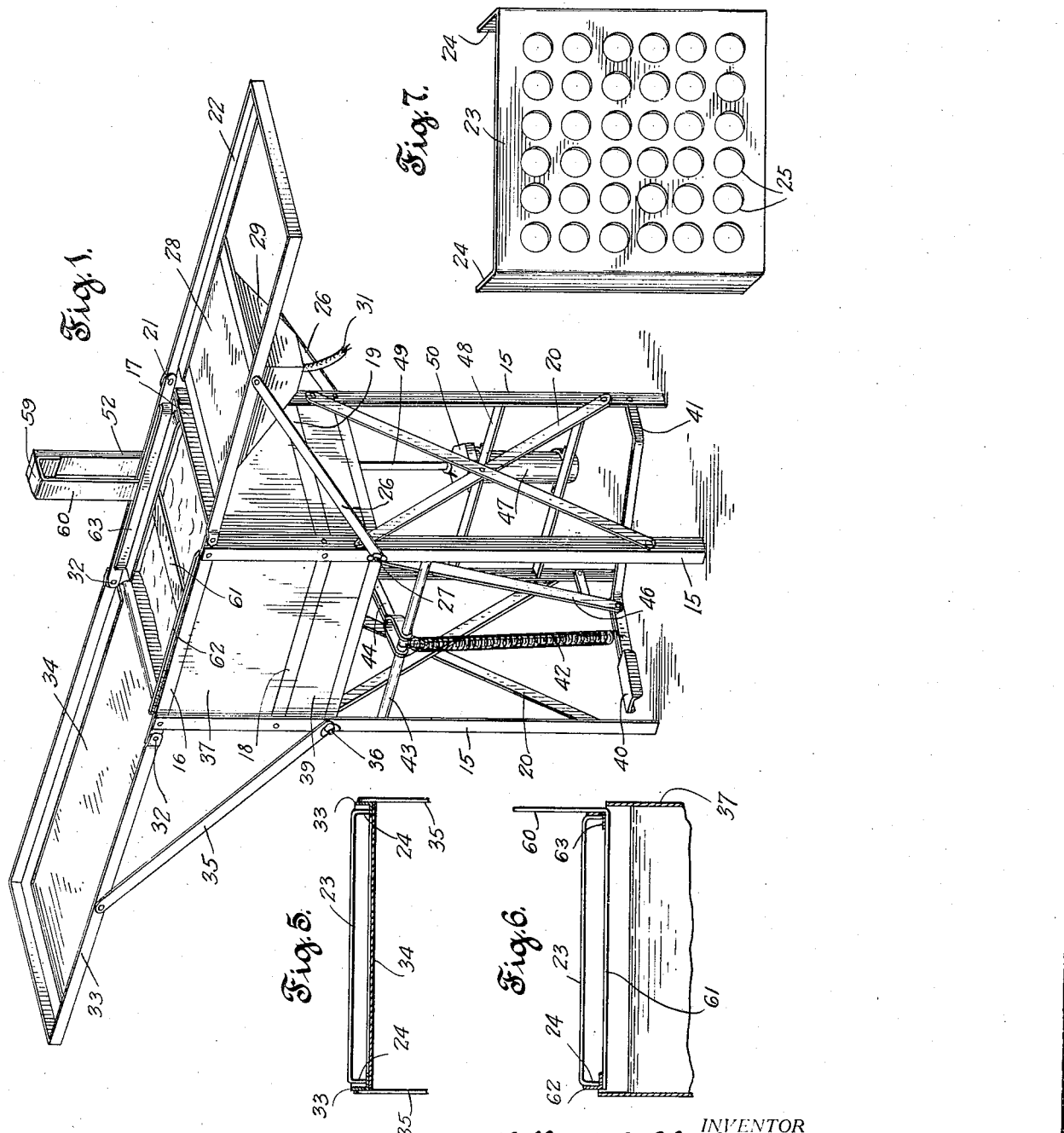
INVENTOR
Clifford C. Shafer
BY Fredk C. Fischer
ATTORNEY Nov. 27, 1923.  1,475,248
C. C. SHAFER
EGG TREATING MACHINE
Filed Feb. 23, 1922    2 Sheets-Sheet 2
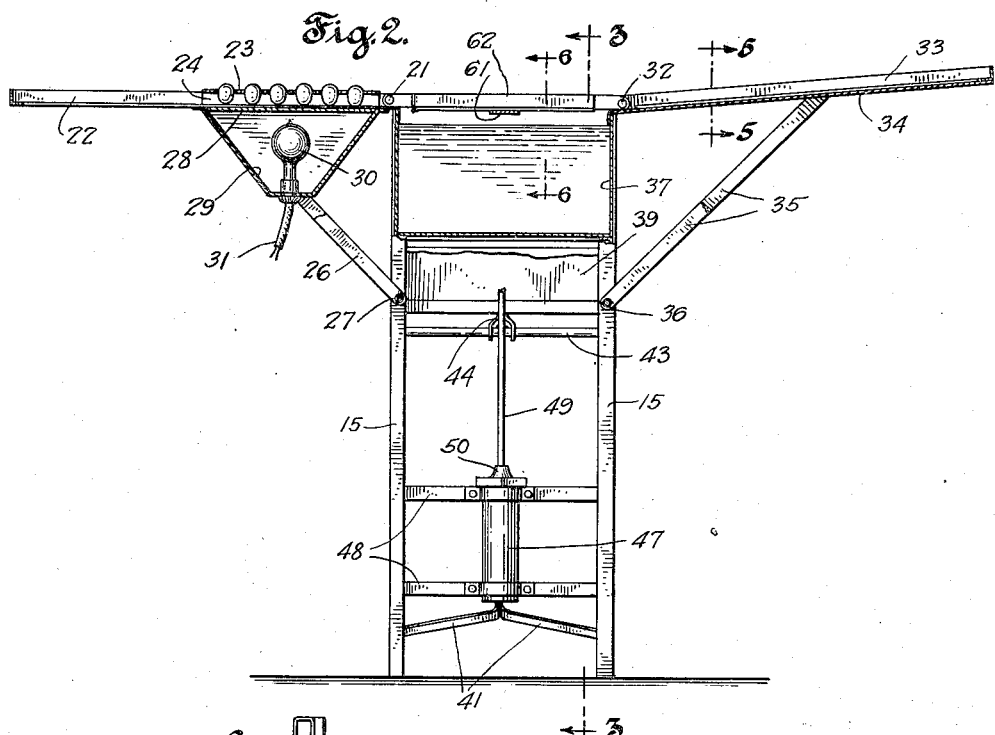
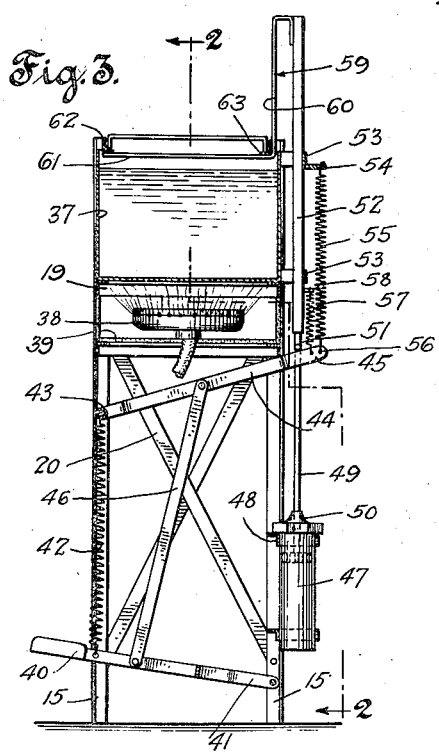
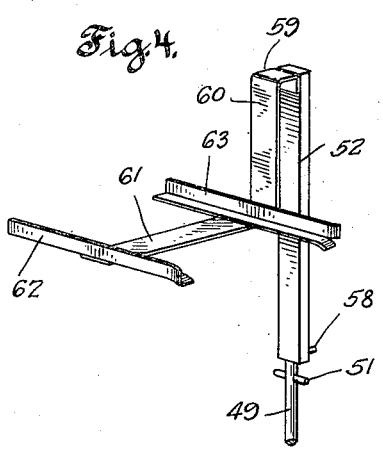
Clifford C. Shafer INVENTOR
BY Fredk C. Fischer
ATTORNEY Patented Nov. 27, 1923.

1,475,248

UNITED STATES PATENT OFFICE.

CLIFFORD C. SHAFER, OF NEWARK, NEW JERSEY.

EGG-TREATING MACHINE.

Application filed February 23, 1922. Serial No. 538,529.

*To all whom it may concern:*

Be it known that I, CLIFFORD C. SHAFER, a citizen of the United States, residing in Newark, in the county of Essex and State of New Jersey, have invented certain new and useful Improvements in Egg-Treating Machines, of which the following is a specification.

This invention relates to egg handling apparatus and has as one of its objects to provide a mechanism, including a tank, for immersing eggs in a liquid preservative, the act of descending and ascending being accomplished in a smooth, gradual manner for reasons further on explained.

Another purpose is to provide means for heating the tank and maintaining the liquid contents at a desired temperature.

A further object is to combine with the apparatus means for the visual detection of "rots and spots" or eggs which have passed their prime, prior to submersion in the heated solution.

In a larger sense the general aim is in the production of a pedally actuated mechanism adapted for continuous operation with eggs in considerable quantities and which can be folded compactly for storage or transportation.

These and other like objects, which will appear as the description progresses, are attained by the novel construction, arrangement and combination of parts hereinafter described and shown in the accompanying drawings, forming a material part of this disclosure, and in which:—

Figure 1 is a perspective front view of an embodiment of the invention.

Figure 2 is a partial rear elevational, partial sectional view taken on line 2—2 of Figure 3.

Figure 3 is a transverse vertical sectional view taken on line 3—3 of Figure 2.

Figure 4 is a perspective view showing the elevator cradle.

Figure 5 is a transverse sectional view taken on line 5—5 of Figure 2.

Figure 6 is a similar view taken on line 6—6 of Figure 2.

Figure 7 is a perspective view of the egg container.

It has been found that whole, clean, fresh eggs may be rendered immune from decay for a very considerable period of time, by immersion in a liquid preservative raised to a high temperature.

It has also been discovered that if the transition of the eggs from the air into the heated liquid, or from the liquid into the air, be abrupt or sudden, a molecular change in the shell apparently takes place, causing small white spots to appear, differing in position and magnitude, and which indicate a thinning or point of porosity in the shell that rapidly result in deterioration of the egg, irrespective of the treatment accorded it.

By reference to the drawings the apparatus is seen to consist of an open, rectangular body composed of four corner posts 15, made of rolled angles as shown or otherwise as preferred, their lower ends resting on the floor or like foundation.

The upper ends of the posts are connected by cross bars 16 at the front and rear, other like bars 17 being attached at the sides.

Similar cross bars 18 and 19 extend in parallel space relation therebelow and the side posts are further stiffened by crossed, diagonal bars 20, all of the several bars being riveted to the posts in a secure manner.

Secured by hinged connections 21 to the right hand side of the body is an open rectangular frame 22, comprised of rolled angles, the distance between the side elements of the frame being such as to receive and guide a tray 23, its down-turned side edges 24 resting on the track formed by the inner flanges of the side frames, said tray being provided with a plurality of openings 25, thirty-six being preferred as convenient for handling, in which are placed the eggs, small end down as shown.

Braces 26 are secured by pivot rivets to the front and rear elements of the frame and are attached by screws 27 to the posts in such manner that when desired the braces may be released and the frame turned down upon its hinges to hang closely adjacent the body.

The length of frame 22 is approximately twice its width, the portion adjacent the body carrying a level translucent plate 28, flush with the track-way and extending completely across the frame.

Below this plate, which may be a square of ground glass, is an enclosed reflector 29 having converging walls, between which is a powerful lamp 30, here shown as an electric bulb supplied with current by the connections 31, which lead to a source of electric energy, the last described structure being essentially a candling device for examination of the eggs preliminary to treatment.

On the other side of the body is attached, by hinges 32, another rectangular frame 33 having a bottom plate 34 which extends over the edge of the body so that the treated eggs may drain without waste of material.

This frame is inclined downwardly from its outer end to facilitate drainage and is partially supported by braces 35, held by screws 36, in the manner of those previously mentioned.

An open rectangular tank 37, preferably of copper, rests in the top of the body, level with the track and drain, it being suited to receive the tray 23, loaded with eggs, so as to be immersed in the liquid contained in the tank.

Below the tank is a heater 38, electric, or gas as shown, for maintaining the temperature of the liquid in the tank at a desired degree of heat and surrounding the heater are walls 39 of asbestos, secured to the posts in any convenient manner.

A foot pedal 40 extends out at the front of the apparatus, the same being part of a lever having forks 41 pivoted near the bottom of the rear posts, the lever being normally held in a raised position by a tension spring 42 connected at its lower end and engaging a transverse rod 43 at its upper end.

Also pivoted on rod 43 is a lever 44, extending rearwardly outward at the center of the body, in the shape of a fork 45. Said lever is operatively connected with the pedal lever 41 by a link 46.

A dash pot 47 is fixed to bars 48 extending transversely between the rear posts, and consists of a cylinder in which a perforate plunger operates, the cylinder being filled with a liquid of more or less viscosity, acting as a deterrent to the piston.

The piston rod 49 passes up through a stuffing box 50 on top of the cylinder, through the fork 45 and carries a transverse pin 51 resting on the forks, the rod also abutting the lower end of a bar 52 guided in brackets 53 and extending above the body as shown.

An arm 54, extending from the upper bracket 53 has attached thereto one end of a coiled tension spring 55, its lower end engaging a pin 56 passing between the forks 45, tending to raise the bar 52, which is tensionally attached to the fork by a short spring 57 engaging a pin 58 set in its lower end.

Fixed to the face of the bar 52, at its upper end, is a strip bracket 59 having a downturned member 60, spaced parallel from the bar and ending in a horizontal member 61 adapted to enter and move vertically in the tank 37.

Transversely at the front end of member 61 is an angle 62 and at the rear is a similar angle 63, their length conforming to the interior of the tank and when in a normal raised position, constitute an extension of the trackway of frame 22.

In operation, the tray 23, having been filled with eggs, is placed on the outer end of frame 22 and then moved over the translucent plate 28, which if the light 30 is on, illuminates the eggs so that the condition of their contents is clearly apparent upon inspection.

If the eggs are found to be good the tray is advanced upon the track angles 62 and 63 until in register with the tank 37.

Upon depressing the pedal 40 the tray is caused to move slowly and steadily down into the hot liquid, remaining as long as required, and then upon releasing the pedal, the tray is returned to its normal level by action of the spring 55, retarded by the dash pot device so gradually as to avoid any sudden, abrupt action.

Thereafter the tray is moved over upon the drain plate 34 so that any surplus liquid is caused to re-enter the tank, and as shown, space for two trays is provided on the drain, thus permitting a substantially continuous series of operation to be performed.

Although the foregoing is descriptive of a preferred embodiment of the invention, it will be understood that minor changes, not involving exercise of inventive ability, may be made without departing from the scope of the appended claims.

Having thus described my invention what I claim as new and desire to secure by Letters Patent, is:—

1. In an apparatus comprising a tank, a track-way suspended thereover, a lever for lowering said track-way into the tank, resilient means for raising the track-way to its normal level, the combination of means controlling the lowering and raising devices whereby a uniform slow motion is obtained in both directions.

2. In an apparatus comprising a tank, a bar vertically slidable adjacent the tank, supports carried by said bar operable in the tank, a lever for depressing said supports, a spring opposed to said lever, the combination of a dash-pot, and operative connections between said bar and dash-pot whereby movement imparted in either direction to said supports is deliberately retarded and rendered substantially uniform.

3. An egg treating apparatus comprising a body, a tank therein, wings hinged on opposite sides of said body, means for supporting said wings when extended, said means when released permitting the wings to fold against said body, means on said wings receptive of an egg tray, a tank midway said wings, a track section thereover, and means for imparting a gradual uniform vertical motion to said track section relative to said tank in raising and lowering.

This specification signed and witnessed this 10th day of February, 1922.

CLIFFORD C. SHAFER.

Witnesses:
 FERDINAND NALL,
 FRED'K C. FISCHER.